United States Patent [19]

Krude et al.

[11] 4,369,979

[45] Jan. 25, 1983

[54] SEALING BOOT ARRANGEMENT FOR A UNIVERSAL JOINT

[75] Inventors: Werner Krude, Siegburg-Kaldauen; Karl-Heinz Müller, Wissen; Helmut Riemscheid, Lohmar, all of Fed. Rep. of Germany

[73] Assignee: Uni-Cardan Aktiengesellschaft, Siegburg, Fed. Rep. of Germany

[21] Appl. No.: 384,993

[22] Filed: Jun. 4, 1982

[30] Foreign Application Priority Data

Jun. 13, 1981 [DE] Fed. Rep. of Germany ....... 3123573

[51] Int. Cl.³ .............................................. F16J 15/52
[52] U.S. Cl. .............................. 277/212 FB; 277/32; 277/237 R; 74/18; 403/50; 464/175
[58] Field of Search ............... 277/12, 32, 138, 212 R, 277/212 C, 212 F, 212 FB, 237; 74/18, 18.1, 18.2; 403/50, 51; 464/173, 175

[56] References Cited

U.S. PATENT DOCUMENTS

| | | | |
|---|---|---|---|
| 3,388,913 | 6/1968 | Tracy .................................... | 277/32 |
| 3,583,244 | 6/1971 | Teinert .................................. | 403/51 |
| 3,798,927 | 3/1974 | Girguis . | |
| 4,210,002 | 7/1980 | Doré ..................................... | 464/175 |
| 4,224,808 | 9/1980 | Gehrke ..................... | 277/212 FB X |

FOREIGN PATENT DOCUMENTS

| | | |
|---|---|---|
| 2205798 | 2/1972 | Fed. Rep. of Germany . |
| 2430109 | 6/1974 | Fed. Rep. of Germany . |
| 2304042 | 8/1974 | Fed. Rep. of Germany ....... 74/18.2 |

*Primary Examiner*—Robert S. Ward, Jr.
*Attorney, Agent, or Firm*—Toren, McGeady and Stanger

[57] ABSTRACT

A sealing arrangement for covering and sealing the open space in a constant velocity universal joint includes a sealing boot, one end of which is fastened to the driven part of the joint and the other end of the sealing boot extending axially from the universal joint is fastened to a sleeve which is axially displaceable and is arranged coaxially surrounding a drive shaft connected to the driving part of the joint. A coating of a material having dirt-repellent and/or water-repellent properties or permitting easy sliding is provided on the drive shaft at least in the range of axial displacement of the sleeve relative to the drive shaft.

10 Claims, 5 Drawing Figures

SEALING BOOT ARRANGEMENT FOR A UNIVERSAL JOINT

BACKGROUND OF THE INVENTION

The present invention relates to an arrangement for covering and sealing the open space between the driving and driven parts of a constant velocity universal joint. The arrangement includes a sealing boot, one end of which is fastened to the driven part of the joint. The other end of the sealing boot facing away from the universal joint is fastened to a sleeve which is axially displaceable and is arranged coaxially surrounding a drive shaft connected to the driving member.

In such an arrangement, the sealing boot extends over the open space in the universal joint extending between the driving part, such as an inner joint member, and the driven part, such as an outer joint member, so that there is relative movement between the sealing boot and the parts extending from the universal joint.

In a known arrangement for sealing a constant velocity universal joint, note German Pat. No. 24 30 109, a sealing boot is used in which the displacement of the universal joint is compensated by an axial deformation of the folds of the sealing boot. Sealing boots of this type contain in their interior a large amount of lubricant, which results in the disadvantage that the operation of universal joints equipped with such sealing boots is very expensive. Centrifugal forces acting on the lubricant during rotation of the joint are another problem resulting from this arrangement.

Another sealing arrangement for a constant velocity universal joint using a sealing boot is disclosed in German Pat. No. 22 05 798. In this arrangement, the sealing boot is secured to the driving and driven parts of the universal joint and is additionally fixed to a cage within the universal joint. By fixing the sealing boot to the cage, a division of the open space enclosed by the sealing boot is achieved, that is, there is an exact division of the bending angle and of the sliding path. Since the cage is positioned within the outer joint member, the intermediate fastening of the sealing boot to the cage results in two portions of the sealing boot which extend asymmetrically relative to one another and are subject to different loads and conditions during operation, so that in such an arrangement it would be obvious to form each sealing boot portion from a material having different properties. This sealing arrangement has the further disadvantage that the cage must not only serve to provide a control action in the universal joint, but must also serve to support the sealing boot.

In view of the foregoing, it is the primary object of the present invention to provide a sealing arrangement for constant velocity universal joints wherein the loads acting on the sealing boot are reduced by a separation of the bending angle and the sliding path.

It is another object of the invention, to afford a sealing arrangement for a universal joint which is inexpensive to operate, uses small quantities of lubricant and is composed of simple structural components.

SUMMARY OF THE INVENTION

In accordance with the present invention, a sleeve is fastened to the sealing boot at the end of the sealing boot facing away from the universal joint and is arranged coaxially surrounding a drive shaft connected to the driving part of the universal joint, wherein the drive shaft is provided with a coating at least in the range of axial displacement of the sleeve relative to the drive shaft. The coating on the drive shaft is of a material which has dirt-repellant and/or water-repellant properties or of a material which has dirt-repellant and/or water-repellant properies and permits easy sliding.

In the sealing arrangement embodying the present invention, there is the advantage that the axially displaceable sleeve serves to support the sealing boot and is axially slidably arranged on the drive shaft. If the constant velocity universal joint is of the sliding type, this sleeve remains stationary during a sliding movement of the joint and the drive shaft slides within the sleeve. Accordingly, the sealing boot is deformed only during bending of the joint. This sealing arrangement has the further advantage that as a result of the geometrical shape of the sealing boot it is possible to use a smaller amount of lubricant in the universal joint. During operation, centrifugal forces force the lubricant back into the joint and only insignificant amounts of lubricant are deposited in the region adjacent to the region of sealing.

In accordance with another feature of the present invention, the dirt-repellant and/or water-repellant material of the coating of the drive shaft is rubber or plastics material.

This feature provides the advantage that the sleeve sliding on the drive shaft can be made of metal without impairing the desired slidability of the sealing boot on the shaft. It is even possible to provide an annular gap between the inner surface of the sleeve and the outer surface of the drive shaft. In this case, the size of the annular gap is selected so that a solid lubricant cannot penetrate through the annular gap at temperatures of approximately 80° C. when the joint is not rotating. When the joint is rotating, the lubricant is heated up and its consistency becomes liquid, however, the lubricant is then forced by the centrifugal forces toward the radially outer portions of the joint.

Another feature of the present invention provides that the sleeve and the sealing boot are made of the same material.

By providing that the sleeve and the sealing boot are of the same material, it is possible to construct these two parts in one piece. Again, a separation of functions with respect to sliding path and bending angle is achieved. If the universal joint is to be operated under normal load conditions, an annular gap can be provided between the inner surface of the sleeve and the outer surface of the drive shaft.

Another feature is the provision of sealing lips on the inner surface of the sleeve, so that a water-tight enclosure of the universal joint is obtained.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
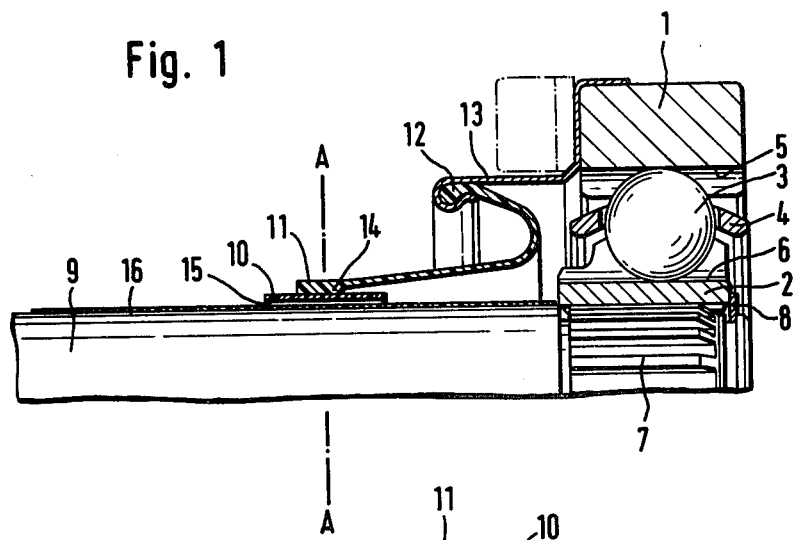
FIG. 1 is an axially extending sectional view of a sealing boot for a constant velocity universal joint.

As shown in FIG. 1, the constant velocity universal joint consists of an outer joint member 1, an inner joint member 7 and a cage 4 located between the inner and outer joint members and holding a number of balls 3. The outer joint member 1 has grooves 5 while the inner joint member 2 has grooves 6 and each pair of opposed grooves receive one of the balls 3 for transmitting torque between the inner and outer joint members. Cage 4 has an outer spherically-shaped surface guided in the hollow space within the outer joint member 1. The inner joint member 2 is connected to an axially extending drive shaft 9 by a spline arrangement 7 and a locking ring 8.

The arrangement for sealing the constant velocity universal joint includes a sealing boot 11 extending in axial direction of the universal joint and a sleeve 10 of plastics material, metal or the same material as the sealing boot 11. One end of the sealing boot 11 is provided with a collar 12 which is fastened to a metal cap 13 which, in turn, is secured to the outer joint member 1. The other end of the sealing boot 11 extending axially from the universal joint is provided with another collar 14 which encircles and is fastened to the sleeve 10. Sleeve 10 is arranged coaxially surrounding the drive shaft 9. An annular gap 15 exists between the inner surface of sleeve 10 and the outer surface 16 of drive shaft 9. In the range of axial displacement of sleeve 10 relative to drive shaft 9, the outer surface 16 of drive shaft 9 has a coating 17 of plastics or a similar material.

Figure 2:
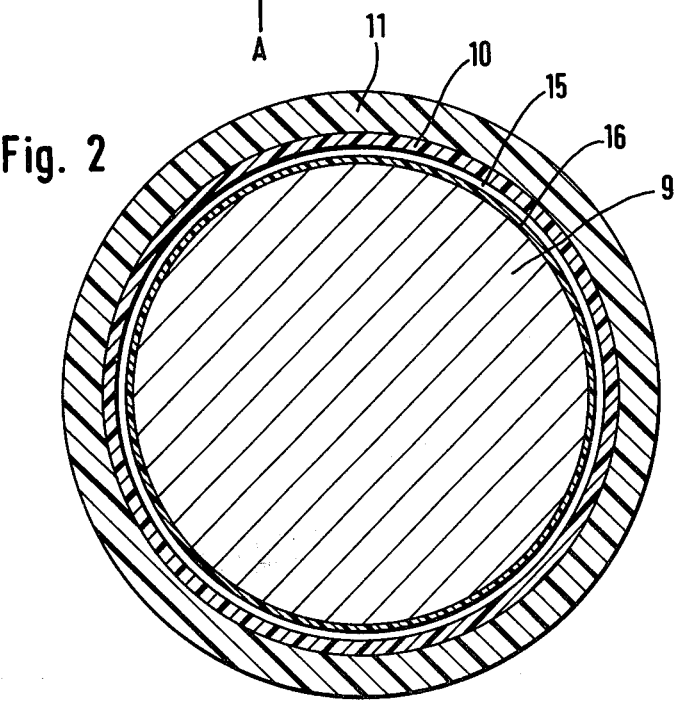
FIG. 2 is a transverse sectional view of the sealing boot illustrated in FIG. 1 taken along sectional line A—A.

FIG. 2 is a sectional view of the arrangement illustrated in FIG. 1 taken along sectional line A—A. As illustrated in FIG. 2, drive shaft 9 has a coating 17 of plastics material on its outer surface 16 and air gap 15 is provided between drive shaft 9 and sleeve 10. Collar 14 serves to fix sealing boot 11 to sleeve 10.

Figure 3:
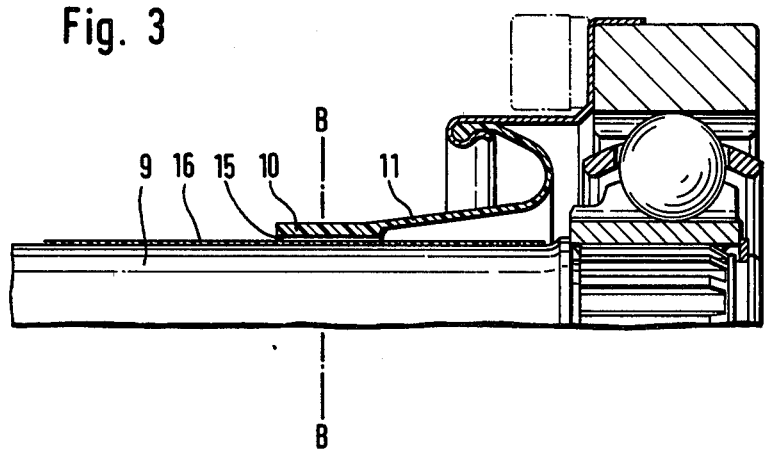
FIG. 3 is an axially extending sectional view of a sealing boot essentially as illustrated in FIG. 1, wherein the sleeve and the sealing boot are constructed in one piece.

The embodiment shown in FIG. 3 is generally the same as that shown in FIG. 1, however, there is the difference that sleeve 10 and sealing boot 11 are constructed in one piece. An annular gap 15 is again provided between the coating 17 on the outer surface 16 of the drive shaft and the inner surface of sleeve 10.

Figure 4:
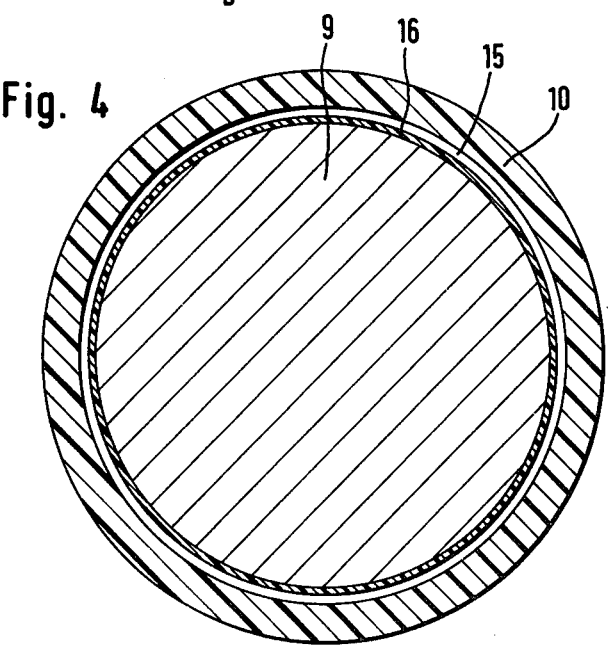
FIG. 4 is a transverse sectional view of the sealing boot illustrated in FIG. 3 taken along sectional line B—B.

FIG. 4 is a sectional view of the embodiment illustrated in FIG. 3 taken along sectional line B—B. The outer surface 16 of drive shaft 9 is coated with a layer of a material with sliding properties and an air gap 15 exists between the coating 17 and the inner surface of sleeve 10.

Figure 5:
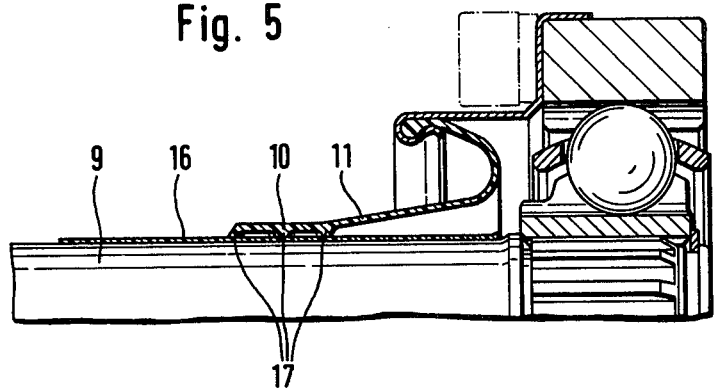
FIG. 5 is an axially extending sectional view of a further embodiment of the sealing boot, wherein sealing lips are provided on the inner surface of the sleeve.

FIG. 5 shows another embodiment of the sealing boot 11 similar to that illustrated in FIG. 3. In this embodiment, the inner surface of sleeve 10 is provided with annular sealing lips 17 in order to afford a water-tight enclosure of the interior of the joint. A coating 17 is again provided on the outer surface 16 of the drive shaft 9.

While specific embodiments of the invention have been shown and described in detail to illustrate the application of the inventive principles, it will be understood that the invention may be embodied otherwise without departing from such principles.

We claim:

1. Sealing arrangement for covering and sealing the open space in a constant velocity universal joint, said universal joint comprising a driving part, a driven part circumferentially encircling said driving part, means for transmitting torque between said driving and driven parts, and drive shaft connected and extending axially from said driving part, a sealing boot assembly enclosing the open space of said universal joint and extending in the axial direction of said driving and driven parts, said sealing boot assembly includes an annular cap member attached to and extending axially from said driven part, a sealing boot having first and second ends, said first end fastened to said cap member, and a sleeve member connected to said second end, said sleeve member arranged coaxially surrounding said drive shaft and axially displaceable relative to said drive shaft, wherein the improvement comprises that said drive shaft has a coating thereon at least in the range of axial displacement of said sleeve member.

2. Sealing arrangement, as set forth in claim 1, wherein said sealing boot extends from the end of said cap member extending axially from said joint to said sleeve member in a convex shape arched inwardly toward said universal joint.

3. Sealing arrangement, as set forth in claim 1, wherein said coating is of a material having dirt-repellant properties.

4. Sealing arrangement, as set forth in claim 1, wherein said coating is of a material having water-repellant properties.

5. Sealing arrangement, as set forth in claim 1, wherein said coating is of a material permitting easy sliding.

6. Sealing arrangement, as set forth in claim 1, wherein said coating is of a material selected from the group consisting of rubber and plastics material.

7. Sealing arrangement, as set forth in claim 1, wherein said sleeve member and said sealing boot are of the same material.

8. Sealing arrangement, as set forth in claim 1, wherein the internal diameter of said sleeve member is greater than the outer diameter of said drive shaft, at least in the range of axial displacement of said sleeve member relative to said drive shaft, so that an annular gap is defined between said sleeve member and said drive shaft.

9. Sealing arrangement, as set forth in claim 1, wherein said sleeve member has annular sealing lips on its inner surface.

10. Sealing arrangement, as set forth in claim 1, wherein said sealing boot and said sleeve member are integral.

* * * * *